(12) United States Patent
Sawada et al.

(10) Patent No.: US 7,286,504 B2
(45) Date of Patent: Oct. 23, 2007

(54) RADIO COMMUNICATION USING A PLURALITY OF BASE STATIONS

(75) Inventors: Manabu Sawada, Yokohama (JP); Kunihiko Sasaki, Kuwana (JP); Hiroshi Harada, Koganei (JP); Masayuki Fujise, Koganei (JP)

(73) Assignees: DENSO Corporation, Kariya (JP); Communications Research Laboratory, Independent Administrative Institution, Tokyo (JP)

( * ) Notice: Subject to any disclaimer, the term of this patent is extended or adjusted under 35 U.S.C. 154(b) by 1080 days.

(21) Appl. No.: 10/187,800

(22) Filed: Jul. 3, 2002

(65) Prior Publication Data

US 2003/0007467 A1    Jan. 9, 2003

(30) Foreign Application Priority Data

Jul. 3, 2001    (JP)    ............................. 2001-202471

(51) Int. Cl.
*H04Q 7/00*    (2006.01)
*H04Q 7/20*    (2006.01)
*H04J 3/24*    (2006.01)

(52) U.S. Cl. ....................... 370/329; 370/474; 455/441

(58) Field of Classification Search ..................... None
See application file for complete search history.

(56) References Cited

U.S. PATENT DOCUMENTS

| | | | | |
|---|---|---|---|---|
| 5,754,961 | A | * | 5/1998 | Serizawa et al. ........... 455/517 |
| 6,052,715 | A | * | 4/2000 | Fukui et al. ................ 725/114 |
| 6,701,164 | B1 | | 3/2004 | Yamaguchi et al. |
| 6,711,142 | B1 | * | 3/2004 | Suzuki et al. ............... 370/329 |
| 6,766,168 | B1 | * | 7/2004 | Lim ........................ 455/435.1 |
| 6,999,438 | B2 | * | 2/2006 | Nounin et al. .............. 370/332 |

FOREIGN PATENT DOCUMENTS

| | | |
|---|---|---|
| JP | A-2000-331285 | 11/2000 |
| JP | A-2002-216191 | 8/2002 |

* cited by examiner

*Primary Examiner*—Steven Nguyen
(74) *Attorney, Agent, or Firm*—Posz Law Group, PLC

(57) ABSTRACT

A communication zone is defined by a plurality of cells, which are separated from one another and has respective fixed base stations. The base stations in the first cell and the last cell are capable of bidirectional communication with a mobile station, while other base stations are capable of unidirectional communication. The base stations are connected to a zone control station, which controls communications with the mobile station within the zone.

5 Claims, 7 Drawing Sheets

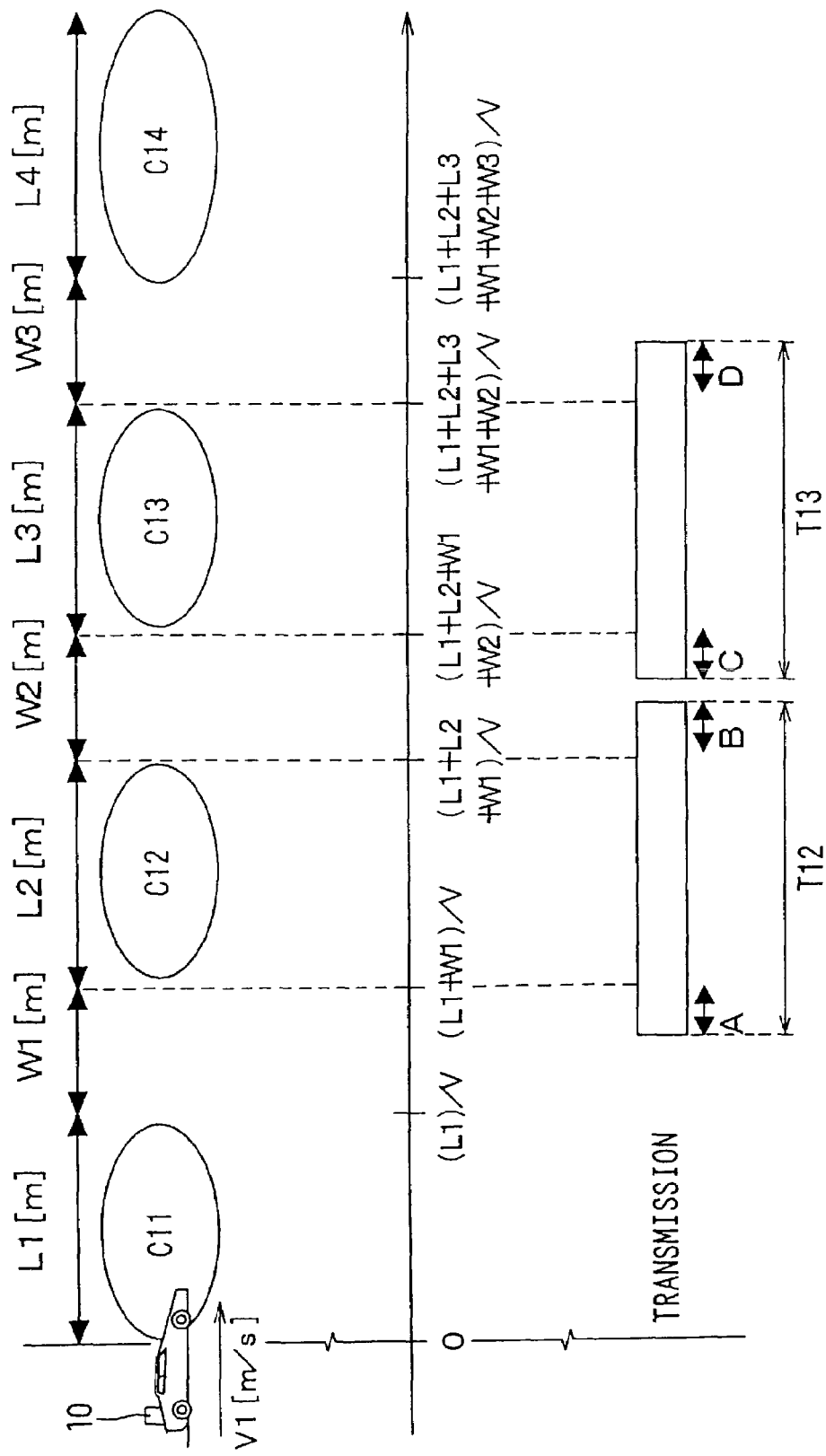

RADIO COMMUNICATION USING A PLURALITY OF BASE STATIONS

CROSS REFERENCE TO RELATED APPLICATION

This application is based on and incorporates herein by reference Japanese Patent Application No. 2001-202471 filed Jul. 3, 2001.

FIELD OF THE INVENTION

The present invention relates to a radio communication system and method, in which a plurality of base stations which include a bidirectional communication type and a unidirectional type are provided in each communication zone.

BACKGROUND OF THE INVENTION

In communication systems in which communication cells are located separately from one another in each communication zone, it is a conventional practice to communicate information between a mobile station and a fixed base station within each communication cell. This practice lowers the throughput of the communication in the case of spot cells such as DSRC (dedicated short range communication), because a mobile station stays within each cell for only a short time period.

SUMMARY OF THE INVENTION

It is therefore an object of the present invention to improve the total throughput of a radio communication system.

According to the present invention, a communication system comprises a plurality of base stations for communicating with a mobile station and a zone control station connected to the base stations for managing communications with the mobile station in the zone. The base stations define respective cells which provide a communication zone. The first base station and the last base station among the plurality of base stations is of a bidirectional communication type capable of communication in both directions. Other base stations between the fist base station and the last base station are of a unidirectional type capable of communication with the mobile station in only one direction.

Preferably, the zone control station receives identification information which identifies the mobile station from the mobile station through the first base station and communicates with the mobile station in the zone by using an in-zone identification information set in correspondence with the identification information received from the mobile station. Further the zone control station divides data for transmission to the mobile station, transmits the divided data from the base station of the unidirectional communication type to the mobile station while assigning numbers to the divided data, receives from the mobile station through the last base station the number of the divided data received by the mobile station, and checks the divided data which has not been received by the mobile station. Still further, the zone control station transmits the divided data which has not been received by the mobile station to a zone control station in a next communication zone.

BRIEF DESCRIPTION OF THE DRAWINGS

The above and other objects, features and advantages of the present invention will become more apparent from the following detailed description made with reference to the accompanying drawings. In the drawings:

FIG. 5 is a timing diagram showing time points of data transmission from base stations to a mobile station in the embodiment;

DETAILED DESCRIPTION OF THE PREFERRED EMBODIMENT

Figure 1:
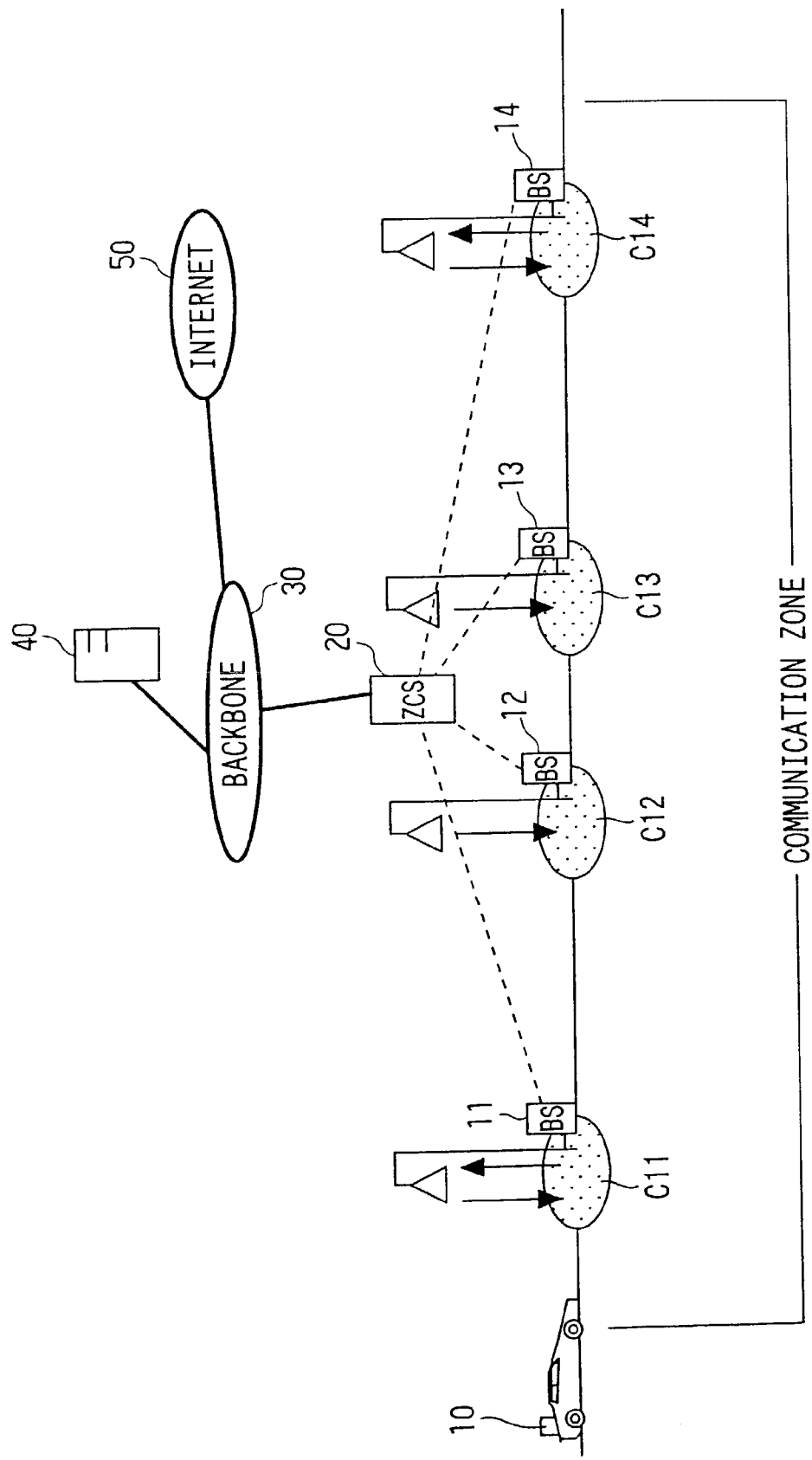
FIG. 1 is a schematic diagram showing a radio communication system according to an embodiment of the present invention.

In the embodiment to follow, one communication zone is defined by four communication cells C11 to C14, which are defined by fixed base stations (BS) 11 to 14, respectively. The first base station 11 and the last base station 14 in the direction of vehicle travel are constructed to be capable of communicating with a mobile station on a vehicle in bidirectional directions. The remaining two base stations 12 and 13 are constructed to be capable of communicating with the mobile station 10 only in one direction, only downlink (from the base stations 12 and 13 to the mobile station 10) in this embodiment. The base stations 11 to 14 are network-connected to a zone control station (ZCS) 20 to manage communications with the mobile station 10 in this zone defined by four cells C11 to C14. The zone control station 20 is connected to a server 40 and Internet 50 through a dedicated backbone (network) 30 to retrieve data, which are transmitted to the mobile station 10, through the dedicated backbone 30.

The above communication zone including the base stations 11 to 14 and the zone control station 20 are provided at a plurality of locations along a vehicle travel path such as an expressway. Each zone control station 20 in a plurality of communication zones (not shown) are connected to the dedicated backbone 30.

Figure 2:
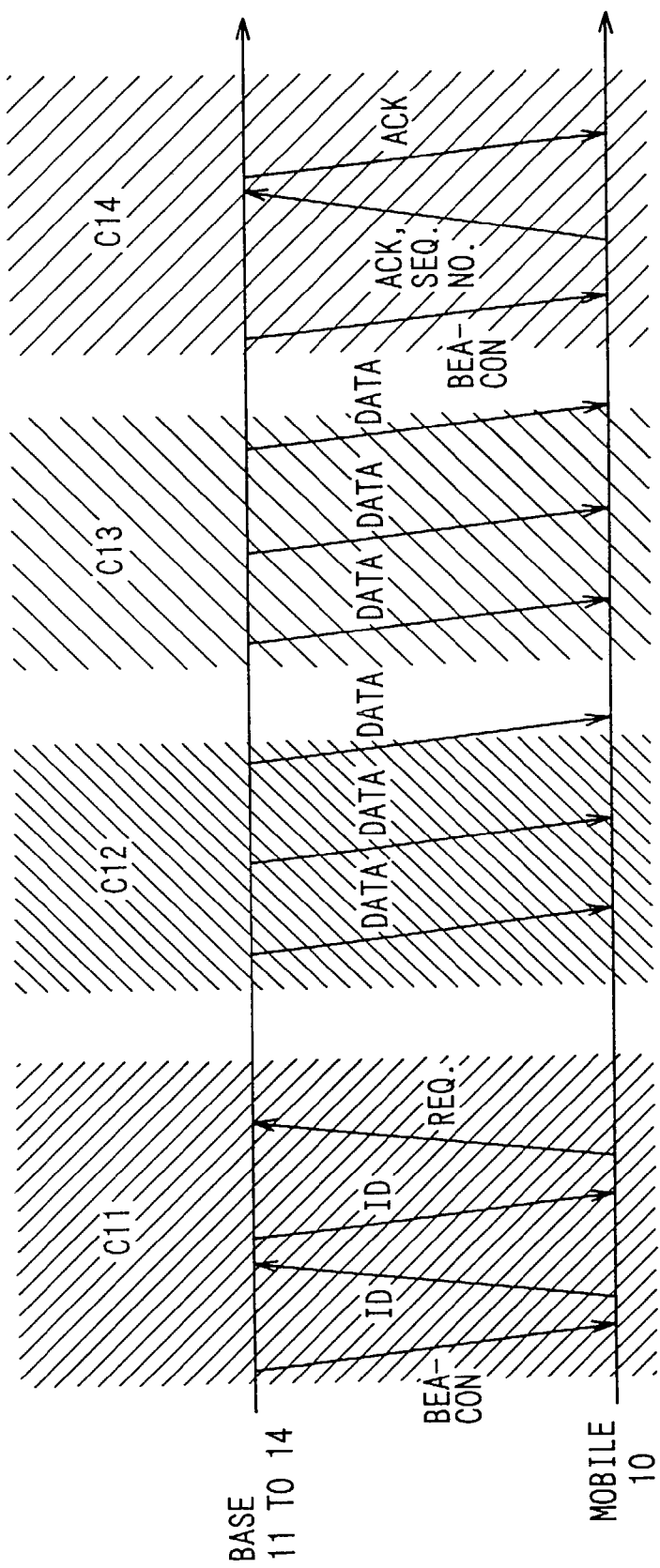
FIG. 2 is a timing diagram showing transmission and reception time points between a fixed base station and mobile stations in the embodiment.
Figure 3:
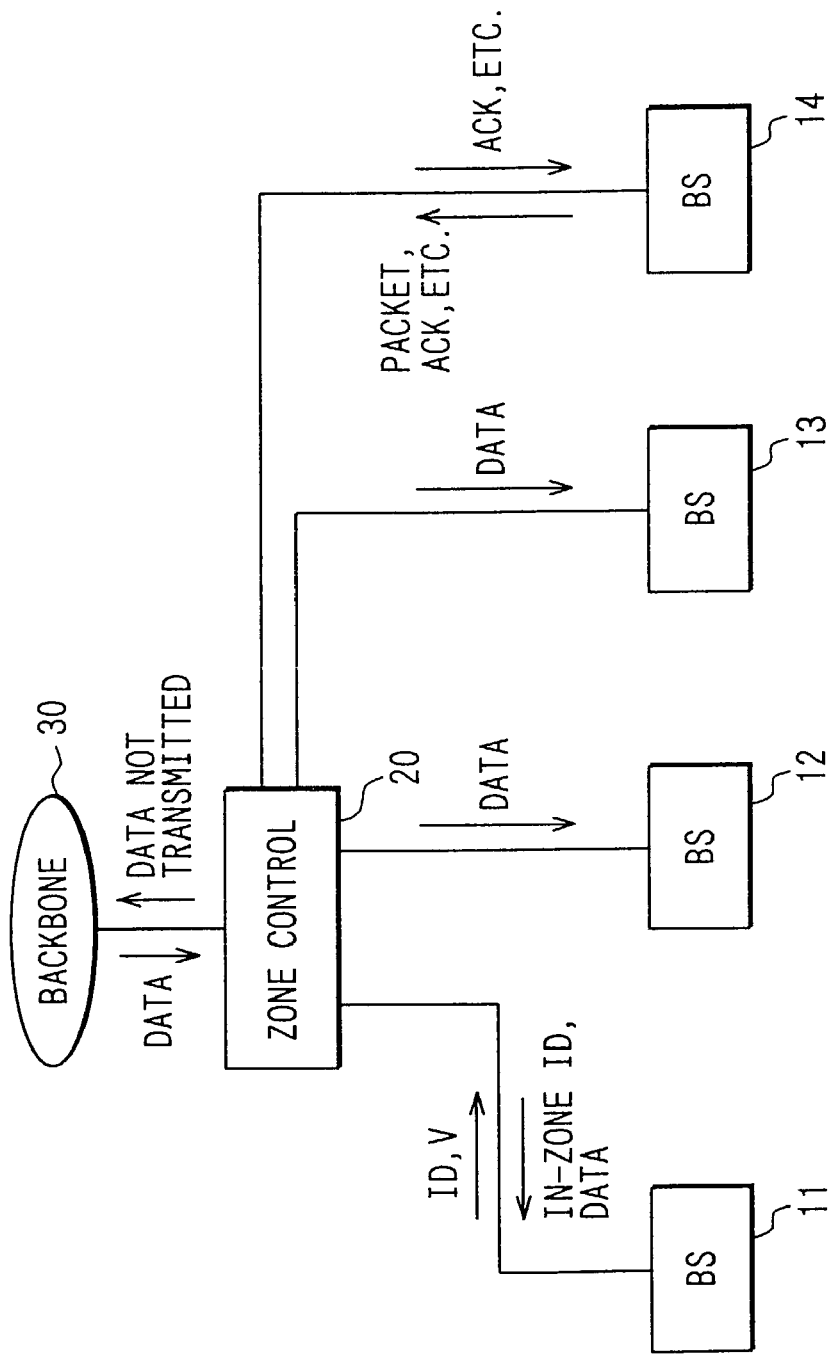
FIG. 3 is a schematic diagram showing a flow path of data in the embodiment.

Assuming that the mobile station 10 moves along the base stations 11 to 14 (from left to right in FIG. 1), data are transmitted and received between the mobile station 10 and the base stations 11 to 14. This data communication is shown in FIG. 2, and data flow path is shown in FIG. 3.

The base station 11 in the first cell C11 continues to transmit a beacon signal at a predetermined repetition interval so that it may be received by the mobile station 10 while the mobile station 10 is traveling within the first cell C11. This beacon signal includes information indicating that this cone is the first one. When the mobile station 10 receives this beacon signal, it transmits a vehicle ID (identification code)

or IP and a present vehicle speed information (V) to the base station 11. The base station in turn forward these vehicle ID and vehicle speed to the zone control station 20.

The zone control station 20 recognizes from the received data that the mobile station 10 has newly entered the first cell C11. The station 20 registers the received vehicle ID in its in-zone vehicle ID list, and sets a corresponding in-zone ID which is identification information indicative of the mobile station 10 within the zone. This in-zone ID is transmitted and assigned to the mobile station 10 through the base station 11.

The mobile station 10 transmits an information request to the base station 11 when it needs data, after receiving the in-zone ID. The base station 11 forwards this request to the zone control station 20.

The zone control station 20 retrieves the requested data through the dedicated backbone 30 in response to the received request, and stores temporarily the retrieved data in the memory provided therein. The zone control station 20 divides the stored data in units of transmission, for instance in packets, and assigns transmission sequence numbers to the divided units of data. It then transmits the data to the mobile station 10 through the base stations 12 and 13 in the second and the third cells C12 and C13, respectively.

The data transmitted from the base stations 12 and 13 are divided so that the same data may not be included in the same packet or the same data partly overlap among packets. It is also possible to transmit the same data in the zones 12 and 13. The mobile station 10 receives the data and stores the same in its memory with the transmission sequence numbers assigned to the packets.

The base station 14 in the last cell C14 continues to repeat transmitting a beacon signal so that it may be received by the mobile station 10 in a similar manner as the base station 11. This beacon signal includes information indicating that this cell C14 is the last cell in the zone. The mobile station 10 recognizes that this is the last communication cell and transmits an acknowledgment signal ACK to the base station 14. The station 10 further transmits the stored transmission sequence numbers of the packet of data received in the cells C12 and C13. These acknowledgment and the transmission sequence numbers are forwarded to the zone control station 20 from the base station 14.

The zone control station 20 transmits an acknowledgement signal ACK to the mobile station 10 through the base station 14. It further compares the transmission sequence numbers stored in its memory with the transmission sequence numbers received from the mobile station 10 to determine sequence numbers of data which were not transmitted or not received. Data of those sequence numbers are transmitted from the zone control station 20 to another zone control station in the next communication zone, so that such data may be transmitted and received in the next communication zone.

In the above embodiment, all transmission sequence numbers of data to be transmitted to the mobile station 10 may be transmitted to the mobile station 10, and transmission sequence numbers of data which the mobile station did not receive may be transmitted in return from the mobile station 10. The server 40 communicates with the zone control station 20 and retrieves vehicle information of mobile stations in each zones. Based on these information, travel of mobile stations are monitored and distribution of data packets to and from the mobile stations are administered.

Figure 4:
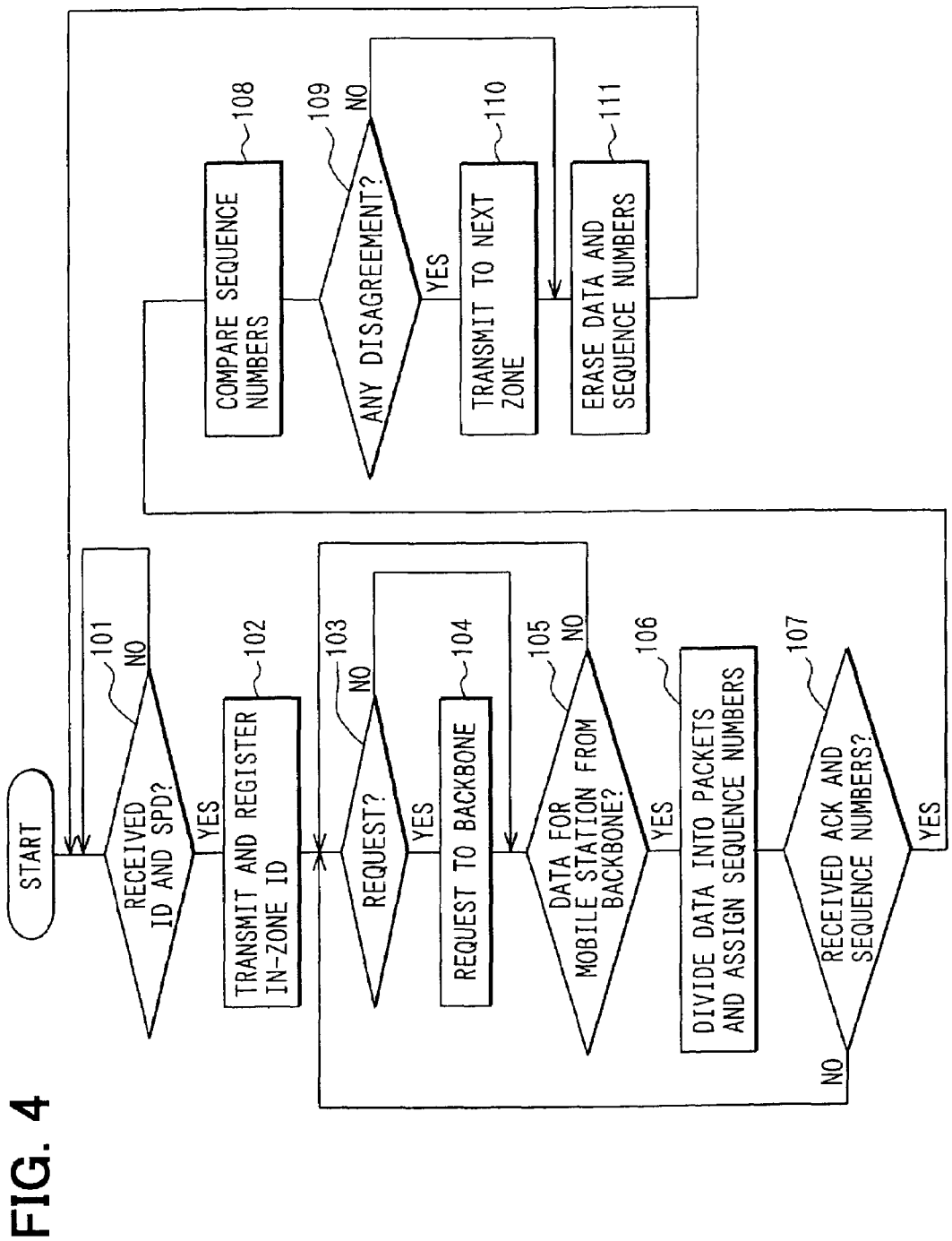
FIG. 4 is a flow diagram showing processing of a zone control station in the embodiment.

The zone control station 20 is programmed to execute processing shown in FIG. 4 to attain the above operation.

The zone control station 20 checks first at step 101 whether the vehicle ID and speed information have been received from the mobile station 10 through the base station 11. If received (YES), the vehicle ID is registered in the in-zone vehicle ID list at step 102. Further, at this step 102, the zone control station 20 sets a corresponding in-zone ID and transmits it to the mobile station 10 through the base station 11.

The zone control station 20 then checks at step 103 whether any requests of data have been received from the mobile station 20. If received (YES), it requests the dedicated backbone 30 to supply data required by the mobile station 10 at step 104. It then checks at step 105 whether the backbone 30 has supplied any data for the mobile station 10. If no data (NO) from the backbone 30, steps 103 to 105 are repeated.

If some data (YES) from the backbone 30, the zone control station 20 stores the data received for the mobile station 10 at step 106. At this step 106, the received data are divided into packets and assigned with different transmission sequence numbers to data packet and transmits those packet data to the mobile station 10 through the base stations 12 and 13. The sequence numbers of the transmitted data packets are stored as a transmission sequence map in relation to the in-zone ID.

The zone control station 20 checks at step 107 whether the acknowledgement and the sequence numbers of the data transmitted to the mobile station 10 have been received from the mobile station 10 through the base station 14. If not (NO), the above steps 103 to 107 are repeated. If received (YES), the zone control station 20 compares at step 108 the sequence numbers of data packets transmitted at step 106 and the sequence numbers received from the mobile station 10. It then checks at step 109 whether the compared sequence numbers are in disagreement, and determines data packets that have not been successfully transmitted to or received from the mobile station 10. The zone control station 20 transmits at step 110 such data packets to another zone control station in the next zone following the present zone of the cells C11 to C14. The zone control station 20 finally erases at step 111 all vehicle IDs stored in the transmission sequence map and the in-zone vehicle ID list.

The zone control station 20 determines time points of transmission of data from the base stations 12 and 13 to the mobile station 10 as shown in FIG. 5. It is noted that the zone control station 20 receives the vehicle speed information V as soon as the mobile station 10 enters the first cell C11. It is assumed that the zone control station 20 has distance information about travel distances L1 to L4 (m) in the cells C11 to C14, and about distance W1 [m] between two adjacent cells C11 and C12 and distance W2 [m] between two adjacent cells C12 and C13.

After the mobile station 10 enters the first cell C11, the zone control station 20 performs data transmission through the base stations 12 and 13 during time intervals T12 and T13, respectively. The time interval T12 starts from time point (L1+W1)/V−A and ends at time point (L1+L2+W1)/V+B, wherein A and B are time margins. The time interval T13 starts from time point (L1+L2+W1+W2)/V−C and ends at time point (L1+L2+L3+W1+W2)/V+D, wherein C and D are time margins. As discussed above, the zone control station 20 determines the transmission intervals assuming that the mobile station 10 travels each communication zone (cells C11 to C14) at the same travel speed as the speed received from the mobile station 10 at the time of entering the first cell C11.

Figure 6A:
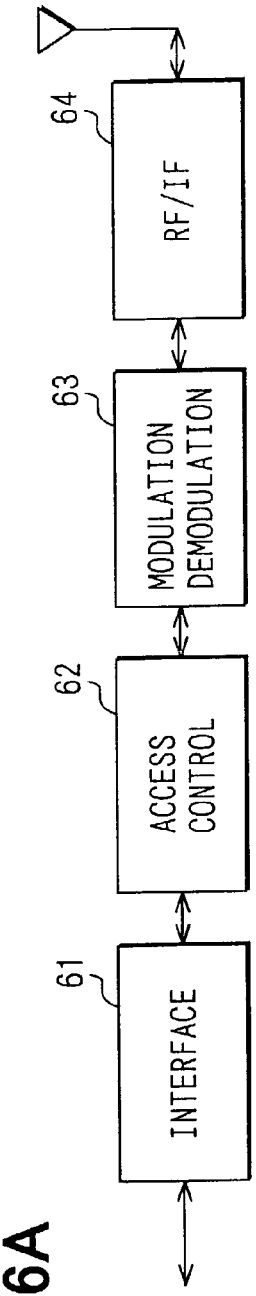
FIGS. 6A and 6B are block diagrams showing a radio communication device used in the base stations in the embodiment.
Figure 6B:
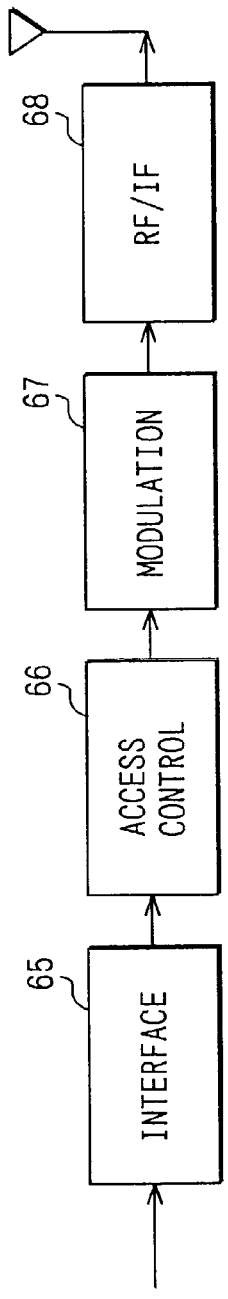

The base stations 11 and 14 are constructed with a network interface 61, a radio access controller 62, a modulator/demodulator 63 and RF/IF (radio frequency/intermediate frequency) circuit 64 as shown in FIG. 6A for attaining bidirectional communication. The base stations 12 and 13 are constructed with a network interface 65, a radio access controller 66, a modulator 67 and a RF/IF circuit 68 as shown in FIG. 6B for unidirectional communication. Thus, the base stations 12 and 13 are in more simple construction than the base stations 11 and 14.

Figure 7:
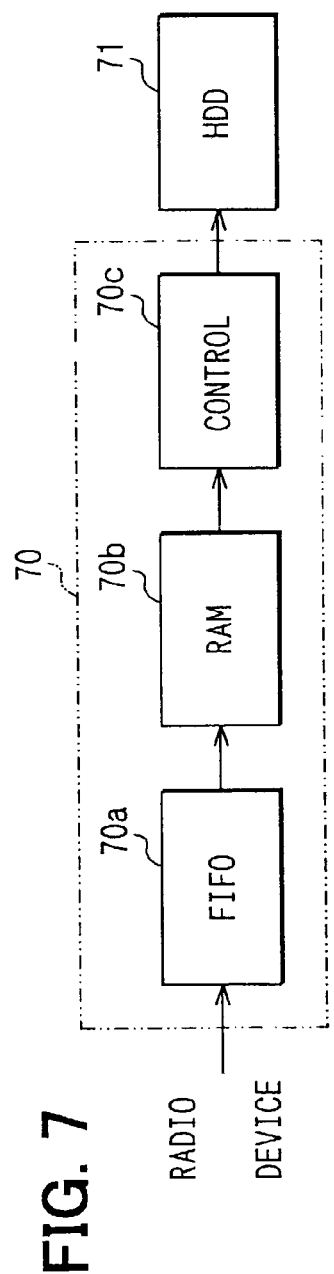
FIG. 7 is a block diagram showing a received packet control unit used in the embodiment.
Figure 8:
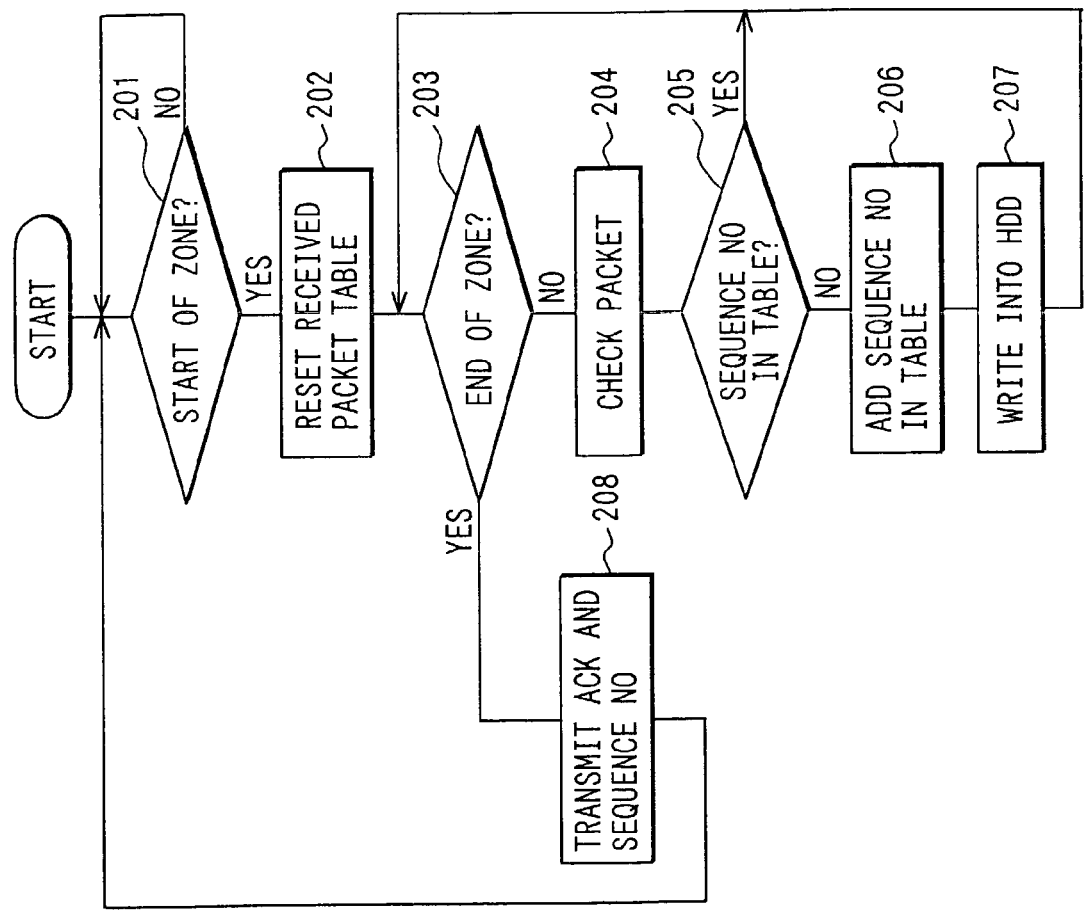
FIG. 8 is a flow diagram showing processing of a received packet control executed by the received packet control unit shown in FIG. 7.

When a part of data or whole data transmitted from the base stations 12 and 13 are the same, the mobile station 10 needs to have a received packet controller 70 as shown in FIG. 7 thereby to avoid dual reception of the same data in the different cells C12 and C13. This controller 70 is constructed with a FIFO (first-in first-out) circuit 70a, RAM 70b and a control circuit 70c. This controller 70 is connected between a mobile station radio device, which is a bidirectional communication type as shown in FIG. 6A, and a HDD (hard disk) 71. Thus, the FIFO 70a passes only data received for the first time and rejects data received already. Thus, the mobile station 10 does not store the same data in its RAM 70b even when the same data are transmitted from the base stations 12 and 13. The control circuit 70c is programmed to perform the received packet control processing as shown in FIG. 8.

The control circuit 70c first checks at step 201 whether the beacon signal has been received from the base station 11 in the first cell C11, that is, whether it is the start of a new communication zone. If so (YES), the received packet table is reset at step 202. The control circuit 70c further checks at step 203 whether the beacon signal has been received from the base station 14 in the last cell C14, that is, whether it is the end of the new zone (last cell).

If it is not the end (NO) at step 203, the control circuit 70c checks at step 204 the received data packets, and checks at step 205 whether the sequence number of the received packet is already in the received packet table. If not (NO), it is determined that this data packet is new and does not overlap with the previously received packets, and the sequence number of this packet is added to the received packet table at step 206. Then this packet data is written in the HDD 71 at step 207. The control circuit 70c repeats the above processing from step 203 to check the next received packet, after step 207 or after YES determination at step 205 indicating that the received packet sequence number is already in the packet table.

The control circuit 70c repeats steps 203 to 207 in the cells C12 and C13 until it becomes the end of communication zone, that is, until the mobile station 10 enters the last cell C14. Thus, only the packet data not yet received are written in the HDD 71 and the sequence numbers of such packet data are stored in the received packet table. If it is the end (YES) at step 203, the acknowledgment of the end of the zone and the sequence numbers of the data packets received and stored in the RAM 70b are transmitted to the base station 14 at step 208.

The present invention should not be limited to the above embodiment, but may be implemented in various other ways. For instance, more than four base stations may be provide in each communication zone. The base stations at both ends of each communication zone may transmit beacon signals indicating bidirectional communication cells, and other base stations between both ends may transmit beacon signals indicating unidirectional communication cells. The unidirectional communication may be an uplink, which is attained from the mobile station to the base station. All the base stations other than the first one in the first cell may be constructed to perform unidirectional communication. All the base stations may be constructed to perform the bidirectional communication, or each base station, which normally performs the unidirectional communication, may be switched to perform the bidirectional communication as the case may be, for instance depending on traffic. The zone control station and base stations in each communication zone may constructed to communicate with each other through optical cables or via radio.

What is claimed is:

1. A communication system comprising:
a plurality of base stations for communicating with a mobile station, the base stations defining respective cells which provide a communication zone; and
a zone control station connected to the base stations for managing communications with the mobile station in the zone,
wherein a first base station among the plurality of base stations includes a bidirectional communication station capable of communication in both directions, and a base station between the first base station and the last base station among the plurality of base stations includes a unidirectional communication station capable of communication with the mobile station in only one direction,
wherein the zone control station is constructed to receive identification information which identifies the mobile station from the mobile station through the first base station and communicate with the mobile station in the zone by using an in-zone identification information set in correspondence with the identification information received from the mobile station, and
wherein the zone control station is constructed to divide data for transmission to the mobile station, to transmit the divided data from the unidirectional communication station to the mobile station while assigning numbers to the divided data, to receive from the mobile station through the last base station the number of the divided data received by the mobile station, and checks the divided data which has not been received by the mobile station.

2. The communication system as in claim 1, wherein the zone control station is constructed to transmit the divided data which has not been received by the mobile station to a zone control station in a next communication zone.

3. The communication system as in claim 1, wherein the unidirectional communication station is provided at different locations, and the divided data transmitted from the unidirectional stations to the mobile station overlaps at least in part.

4. The communication system as in claim 1, wherein the last base station includes a bidirectional communication station.

5. A communication system comprising:
a plurality of base stations for communicating with a mobile station, the base stations defining respective cells which provide a communication zone; and
a zone control station connected to the base stations for managing communications with the mobile station in the zone,
wherein a first base station among the plurality of base stations includes a bidirectional communication station capable of communication in both directions, and a base station between the first base station and the last base station among the plurality of base stations includes a unidirectional communication station capable of communication with the mobile station in only one direction, and wherein the zone control station is constructed to receive information of travel speed of the mobile station from the mobile station through the first base station, and to determine a time point of transmission of data from the unidirectional communication station to the mobile station.

* * * * *

UNITED STATES PATENT AND TRADEMARK OFFICE
CERTIFICATE OF CORRECTION

PATENT NO. : 7,286,504 B2  Page 1 of 1
APPLICATION NO. : 10/187800
DATED : October 23, 2007
INVENTOR(S) : Manabu Sawada et al.

It is certified that error appears in the above-identified patent and that said Letters Patent is hereby corrected as shown below:

Title page

Correct Item (73), as Assignees to read as follow

--DENSO CORPORATION, Kariya (JP)
 NATIONAL INSTITUTE OF INFORMATION AND COMMUNICATIONS
 TECHNOLOGY, Tokyo (JP)--

Signed and Sealed this

Twenty-sixth Day of February, 2008

JON W. DUDAS
*Director of the United States Patent and Trademark Office*